United States Patent [19]
Kuroda et al.

[11] Patent Number: 5,222,060
[45] Date of Patent: Jun. 22, 1993

[54] ACCESSING METHOD, AND INFORMATION PROCESSING METHOD AND INFORMATION PROCESSING DEVICE UTILIZING THE SAME

[75] Inventors: Ryo Kuroda, Atsugi; Hiroyasu Nose, Zama; Toshihiko Miyazaki, Hiratsuka; Takahiro Oguchi, Atsugi; Kunihiro Sakai, Isehara, all of Japan

[73] Assignee: Canon Kabushiki Kaisha, Tokyo, Japan

[21] Appl. No.: 577,551

[22] Filed: Sep. 5, 1990

[30] Foreign Application Priority Data

Sep. 7, 1989 [JP] Japan .................. 1-233651
Aug. 22, 1990 [JP] Japan .................. 2-221708

[51] Int. Cl.$^5$ .......................... G11B 9/00; H01J 37/00
[52] U.S. Cl. ..................................... 369/126; 250/306
[58] Field of Search ................ 369/126, 101, 44.26, 369/32, 50; 250/306, 307, 310

[56] References Cited

U.S. PATENT DOCUMENTS

| | | | |
|---|---|---|---|
| 4,087,842 | 5/1978 | Manly | 360/77 |
| 4,939,363 | 7/1990 | Bando et al. | 250/307 |
| 4,998,016 | 3/1991 | Nose et al. | 250/306 |
| 5,038,322 | 8/1991 | Van Loenen | 250/306 |
| 5,053,699 | 10/1991 | Aton | 250/306 |
| 5,066,858 | 11/1991 | Elings et al. | 250/306 |
| 5,081,353 | 1/1992 | Yamada et al. | 250/306 |
| 5,083,022 | 1/1992 | Miyamoto et al. | 250/306 |
| 5,091,880 | 2/1992 | Isono et al. | 369/126 |
| 5,107,112 | 4/1992 | Yanagisawa et al. | 250/306 |

FOREIGN PATENT DOCUMENTS

| | | |
|---|---|---|
| 0247219 | 12/1987 | European Pat. Off. . |
| 0325056 | 7/1989 | European Pat. Off. . |
| 63-161552 | 7/1988 | Japan . |
| 63-161553 | 7/1988 | Japan . |

OTHER PUBLICATIONS

G. Binning, et al., "Surface Studies by Scanning Tunneling Microscopy", *Physical Review Letters*, vol. 49, No. 1, pp. 57-60, Jul. 5, 1982.

*Primary Examiner*—Andrew L. Sniezek
*Assistant Examiner*—Nabil Hindi
*Attorney, Agent, or Firm*—Fitzpatrick, Cella, Harper & Scinto

[57] ABSTRACT

An accessing method which is a method for accessing a probe electrode to the standard position of the format pattern relative to a medium having a format pattern having a standard position includes the step of scanning the probe electrode so that the probe electrode crosses over the format pattern and detecting the change in tunnel current which occurs by such scanning, and the step of detecting the standard position of the format pattern based on the change in tunnel current detected and moving the probe electrode to the standard position detected. An information processing method containing the step of scanning the probe electrode along the format pattern and reading the information by detection of the tunnel current and an information processing device therefor are also disclosed.

24 Claims, 4 Drawing Sheets

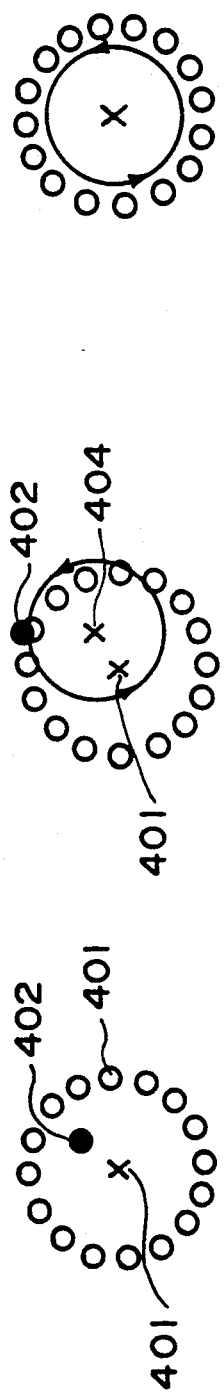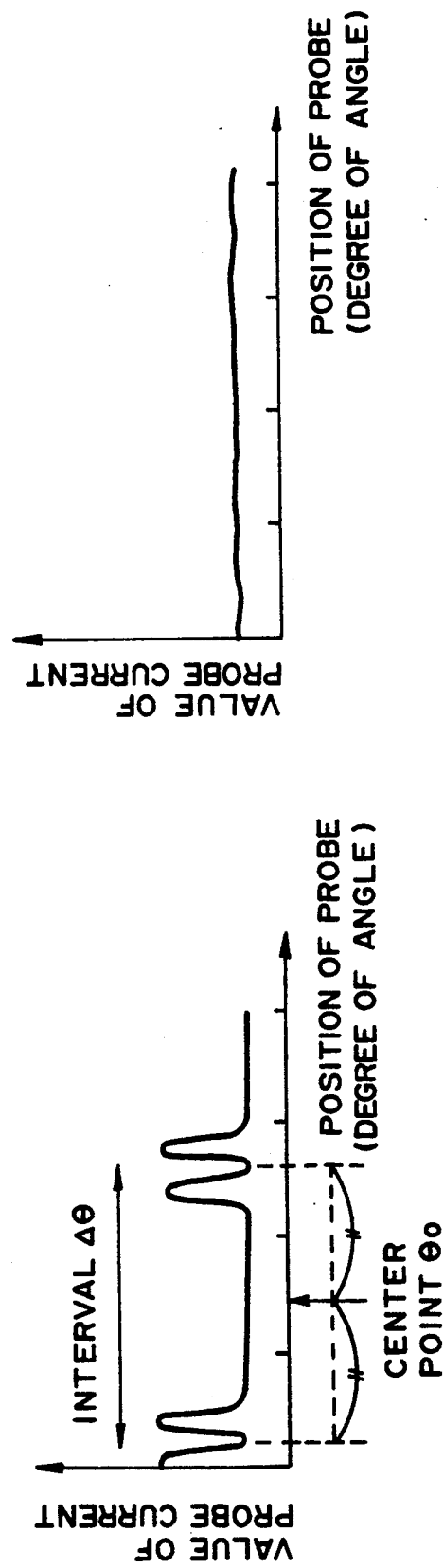
FIG. 4A  FIG. 4B  FIG. 4C
FIG. 4D  FIG. 4E

ACCESSING METHOD, AND INFORMATION PROCESSING METHOD AND INFORMATION PROCESSING DEVICE UTILIZING THE SAME

BACKGROUND OF THE INVENTION

1. Field of the Invention

This invention relates to an accessing method, and an information processing method including recording/reproducing/erasing of information and an information processing device utilizing the same.

More particularly, it pertains to an accessing method which has enabled high speed access of a probe electrode to a plurality of recording regions or reproducing regions in recording by use of a scanning tunnelling microscope (STM), and to an information processing method and an information processing device utilizing the same.

2. Related Background Art

In recent years, uses of memory materials form the nucleus of electronics industries such as computers and related instruments thereof, video discs, digital audio discs, etc., and developments of their materials have been actively progressed. Performances demanded for memory materials, which may differ depending on uses, may be generally as follows:

(1) high density and large recording capacity;
(2) quick response speed in recording and reproducing;
(3) small consumption of power;
(4) high productivity and low cost, etc.

In the past, semiconductor memories or magnetic memories employing magnetic materials or semiconductors as the base materials have been predominantly used, but in recent years, with the progress of laser technique, recording medium of low cost and high density according to optical memory by use of an organic thin film such as organic dye, photopolymer is launched into the arena.

On the other hand, recently, a scanning tunnelling microscope (hereinafter abbreviated as STM) which observes directly the electron structure of the surface atom of a conductor has been developed [G. Binnig et al., Phys. Rev. Lett., 49, 57 (1982)], whereby it has become possible to measure real spatial images of high resolution irrespectively of whether they are single crystalline or amorphous. Besides, it has the advantage that observation can be done at low power without damaging the medium with current, and further it can be actuated in air and therefore used for various materials. For such reasons, a wide scope of applications has been expected.

STM utilizes the phenomenon that tunnel current flows when a probe of a metal (probe electrode) and an electroconductive substance are approached to a distance of about 1 nm with application of a voltage therebetween. This current is very sensitive to the change in distance between the probe and the substance, and by scanning of the probe so as to maintain a constant tunnel current, the surface structure of the real space can be drawn and at the same time various information concerning the whole electron cloud of the surface electrons can be read. In this case, resolution in the interplanar direction is about 0.1 nm.

Accordingly, by applying the principle of STM, it is possible to perform high density recording and reproducing sufficiently at atomic order (subnanometer). As the recording and reproducing method in this case, there have been proposed the method in which recording is performed by changing the surface state of an appropriate recording layer by use of a high energy electromagnetic wave such as particulate rays (electron beam, ion beam) or X-ray, etc. and an energy ray such as visible, UV-ray, etc. and reproducing is effected by STM, or the method in which a material having the memory effect to the switching characteristics of voltage current such as a thin film layer of a $\pi$-electron type organic compound or a chalcogenide is used as the recording layer, and recording and reproducing are performed by use of STM, etc. (Japanese Laid-open Patent Application Nos. 63-161552, 63-161553). For example, according to this method, if the bit size of recording is made 10 nm, recording and reproducing with a capacity as large as $10^{12}$ bit/cm$^2$ is possible.

In realizing the prior art example as mentioned above, a precision of a nanometer or less is required for relative registration between the probe electrode and the recording medium, and also high rigidity in the apparatus (a structure having a high resonance frequency) and high speed characteristics during recording and reproducing are demanded to be possessed in combination.

Under the present situation, a driving device which can satisfy these performances is a piezoelectric device, but since the practical limit of stroke depending on the dielectric strength is about 10 $\mu$m, if a piezoelectric device alone is used as the driving mechanism for relative registration of the probe electrode and the recording medium, the recording region becomes smaller as 10 $\mu$m square, whereby the recording capacity becomes smaller as $10^6$ bit/cm$^2$. Therefore, for enlargement of capacity, it is required to combine coarse adjustment with the driving mechanism, and when leading into the fine adjustment region by a piezoelectric device from the coarse adjustment region, it has been necessary to provide a positional standard pattern for fine adjustment having a structure than the coarse adjustment precision.

However, according to such method, since the positional standard pattern for fine adjustment is dimensionally scanned and registration of the fine adjustment region is effected from its dimensional image, there is involved the drawback that a long time is required for dimensional scanning of the probe electrode and dimensional image data processing during access of the probe electrode to the recording region.

SUMMARY OF THE INVENTION

Accordingly, an object of the present invention is to cancel such drawback and to provide an accessing method which can perform access of a probe electrode to a plurality of recording regions or reproducing regions at high precision and high speed, and can also perform recording of large capacity, and an information processing method and an information processing device utilizing the same.

The above object can be accomplished by the present invention as described below. More specifically, it is an object of the present invention to provide an accessing method which is a method for accessing a probe electrode to the standard position of the format pattern relative to a medium having a format pattern having a standard position, comprising the step of scanning the probe electrode so that said probe electrode may cross over the format pattern and detecting the change in tunnel current which occurs by such scanning, and the step of detecting the standard position of the format pattern based on the change in tunnel current detected and moving the probe electrode to the standard position detected.

It is a further object of the present invention to provide an information processing method, comprising the step of scanning a probe electrode so that said probe electrode may cross over the format pattern relative to a medium having a format pattern having a standard position and detecting the change in tunnel current which occurs by such scanning, the step of detecting the standard position of the format pattern based on the change in tunnel current detected and moving the probe electrode to the standard position detected, and the step of performing recording of an information along the format pattern by scanning said probe electrode along the format pattern.

It is a further object of the present invention to provide an information processing method, comprising the step of scanning a probe electrode relative to a medium with an information recorded along a format pattern having a standard position so that said probe electrode may cross over the format pattern and detecting the change in tunnel current which occurs by such scanning, the step of detecting the standard position of the format pattern based on the change in tunnel current detected and moving the probe electrode to the standard position detected, and the step of scanning said probe electrode along the format pattern and reading the information recorded by detection of the tunnel current.

It is a further object of the present invention to provide an information processing method, comprising the step of scanning a probe electrode relative to a medium with an information recorded along a format pattern having a standard position so that said probe electrode may cross over the format pattern and detecting the change in tunnel current which occurs by such scanning, the step of detecting the standard position of the format pattern based on the change in tunnel current detected and moving the probe electrode to the standard position detected, and the step of scanning said probe electrode along the format pattern and erasing the recorded information.

It is a further object of the present invention to provide an information processing device, comprising a recording medium having a format pattern having a standard position, a probe electrode arranged proximately to said recording medium and a circular driving mechanism for circular scanning of said probe electrode.

BRIEF DESCRIPTION OF THE DRAWINGS

FIG. 4A-FIG. 4E is an illustration for explanation of the accessing method to the recording region in the present invention.

DETAILED DESCRIPTION OF THE PREFERRED EMBODIMENTS

According to a preferred embodiment of the present invention, in performing recording and reproducing by application of a voltage on a recording medium while circular scanning a probe electrode for recording and reproducing, by recording a circumferential format pattern previously at the center portion of the recording region, scanning the probe electrode circumferentially to detect the positional relationship between the scanning pattern and the format pattern and performing access of the probe electrode to the recording region, an information processing device with large capacity enabling simple access of high precision and high speed is realized.

Figure 1:
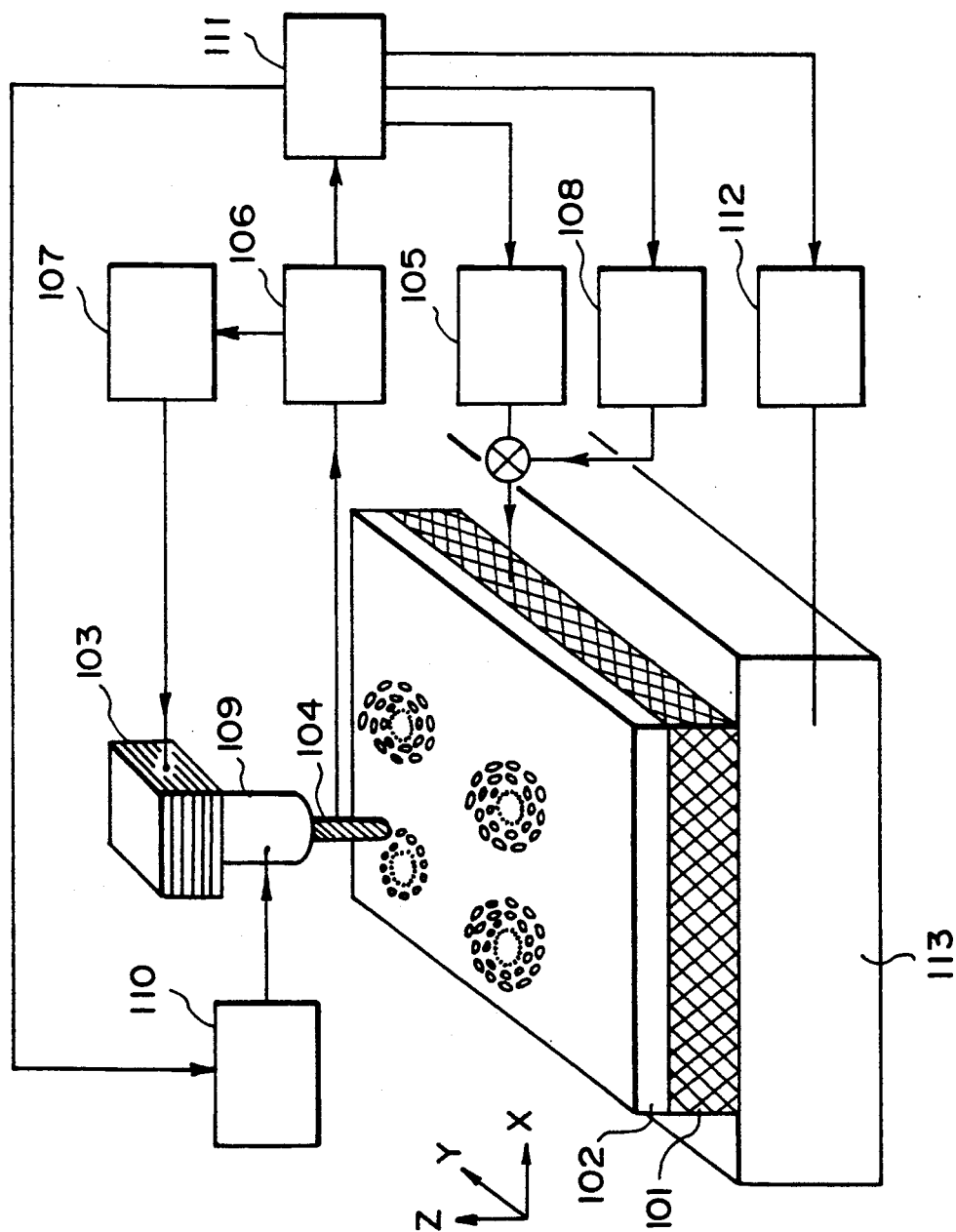
FIG. 1 is an illustration of the information processing device practicing the present invention.

FIG. 1 is an illustration showing a preferred embodiment of the present invention. In the same Figure, as the substrate 101, an epitaxial growth surface of gold or a graphite cleavage surface onto a flat substrate such as glass or mica may be employed. As the recording layer 102, employing squarylium-bis-6-octylazulene (hereinafter abbreviated as SOAZ), a built-up film of two layers of monomolecular films is formed according to the Langmuir-Blodgett's method on the substrate electrode 101 surface. Next, by the vertical driving mechanism 103, the probe electrode 104 is made proximate to a distance of about subnanometer relative to the desired position of the recording layer 102. Here, for the probe electrode 104, an electroconductive material with the tip end being sharp (radius of curvature < 1 $\mu$m) such as a tungsten wire subjected to electrolytic polishing, a platinum wire, etc. mechanically cut may be used. For the vertical driving mechanism 103, a PZT device may be employed, a voltage (bias voltage) of about 0.1 to 1 V is applied by the bias power source 105 between the substrate electrode 101 and the probe electrode 104, the probe current flowing between the two is detected by the probe current detector 106, and the distance between the probe electrode 104 and the substrate electrode 101 is controlled by the servo circuit 107 so that the probe current value Ip may be substantially constant between $10^{-10} A \leq Ip \leq 10^{-8} A$.

Figure 5:
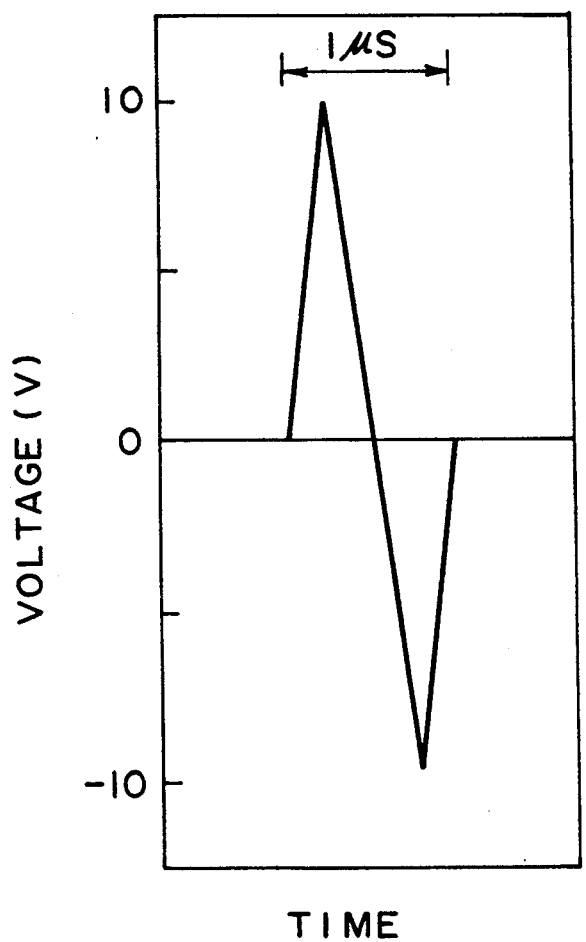
FIG. 5 is an illustration showing the recording signal waveform.

Recording/erasing are practiced as described below. The signal from the recording/erasing signal generator 108 is applied between the substrate electrode 101 and the probe electrode 104, and recording/erasing are practiced at a desired position of the recording layer 102 proximate to the tip end of the probe electrode 104. As for reproducing, similarly, a bias voltage for reading is applied between the substrate electrode 101 and the probe electrode 104 by the bias power source 105, reproducing is effected at a desired position of the recording layer 102 proximate to the tip end of the probe electrode 104. Specifically, when a voltage for reading of 1.5 V which is a voltage not exceeding the threshold value voltage which gives rise to the electric memory effect between the probe electrode 104 and the substrate electrode 101 was applied and the current value was measured, OFF state was exhibited at $\mu$A or lower. Next, after applying a triangular pulse voltage having the waveform shown in FIG. 5 which is a voltage of the threshold value voltage $T_{th-ON}$ which gives rise to the ON state or higher, for reproducing a voltage of 1.5 V was again applied between the electrodes, and the current was measured. As the result, a current of about 0.7 mA flowed, indicating the ON state. Thus, ON state was recorded. Next, after applying a triangular pulse voltage with a peak voltage of 5 V which is a voltage of the threshold value voltage $V_{th\text{-}OFF}$ at which ON state changes to OFF state or higher and a pulse width of 1 us, 1.5 V was again applied for reproducing. As the result, the current value at this time was μA or less, whereby returning to the OFF state was confirmed.

The electric memory effect as mentioned in the present invention refers to at least two different resistance states corresponding to voltage application, which respective states are freely transitionable to each other by application of a voltage or a current exceeding the threshold value which changes the electroconductivity of the recording layer, and which respective states obtained are capable of retaining their states so long as a voltage or a current not exceeding the threshold value is applied.

Specific examples of the material constituting the recording layer may include those as set forth below.

(1) There can be employed amorphous semiconductors such as oxide glass, borate glass or chalcogenide glass containing Se, Te, As compounded with an element of the group III, IV, V, VI of the periodic table. They are genuine semiconductors with an optical band gap Eg of 0.6 to 1.4 eV or an electric activation energy ΔE of about 0.7 to 1.6 eV. Specific examples of the chlocogenide glass may include As-Se-Te type, Ge-As-Se type, Si-Ge-As-Te type such as $Si_{16}Ge_{14}As_5Te_{65}$ (suffixes are atomic %), or Ge-Te-X type, Si-Te-X type (X=small amount of group V, VI element) such as $Ge_{15}Te_{81}Sb_2S_2$, etc.

Further, an Ge-Sb-Se type chalcogenide glass can be also employed.

(2) Further, there can be employed organic semiconductor layers having an electron accepting compound such as tetraquinodimethane (TCNQ), TCNQ derivatives such as tetrafluorotetracyanoquinodimathane (TCNQF$_4$), tetracyanoethylene (TCNE) and tetracyanonaphthoquinodimethane (TNAP), etc. and a salt of a metal with relatively lower reduction potential such as copper, silver, etc. deposited on an electrode.

As the method for forming such organic semiconductor layer, the method of vacuum depositing the above electron accepting compound on an electrode of copper or silver may be employed.

(3) Further, there can be employed a recording medium having a molecule having in combination a group having π electron level and a group having only σ electron level laminated on an electrode.

Examples of the structure of the dye having a suitable π-electron system for the present invention may include dyes having porphylline skelton such as phthalocyanine, tetraphenylporphine, azulene type dyes having squarylium group and croconicmethine group as the binding chain, and dyes similar to cyanine type having 2 nitrogen containing heterocyclic rings such as quinoline, benzothiazole, benzooxazole, etc. bonded through squarylium group and croconicmethine group, or condensed polycyclic aromatics such as cyanine dyes, anthracene and pyrene, etc., and chain compounds comprising polymers of aromatic rings and heterocyclic rings compound, and polymers of diacetylene groups, further derivatives of tetraquinodimethane or tetrathiafulvalene and homologues thereof, and charge transfer complexes thereof, and further metal complex compounds such as ferrocene, trisbipyridine ruthenium complexes, etc.

In addition to the low molecular weight materials as mentioned above, various high molecular weight materials can be also used.

For example, addition polymers such as polyacrylic acid derivatives, etc., condensation polymers such as polyimide, polyphenylene, polythiophene, etc., ring-opened polymers such as nylon, etc., or biological high molecular weight materials such as polypeptide, bacteriorhodopsin, etc. can be included.

Figure 2:
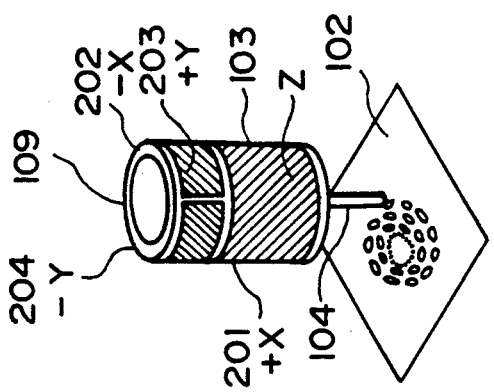
FIG. 2 is an illustration showing a circular scanning driving mechanism of a probe electrode.
Figure 3:
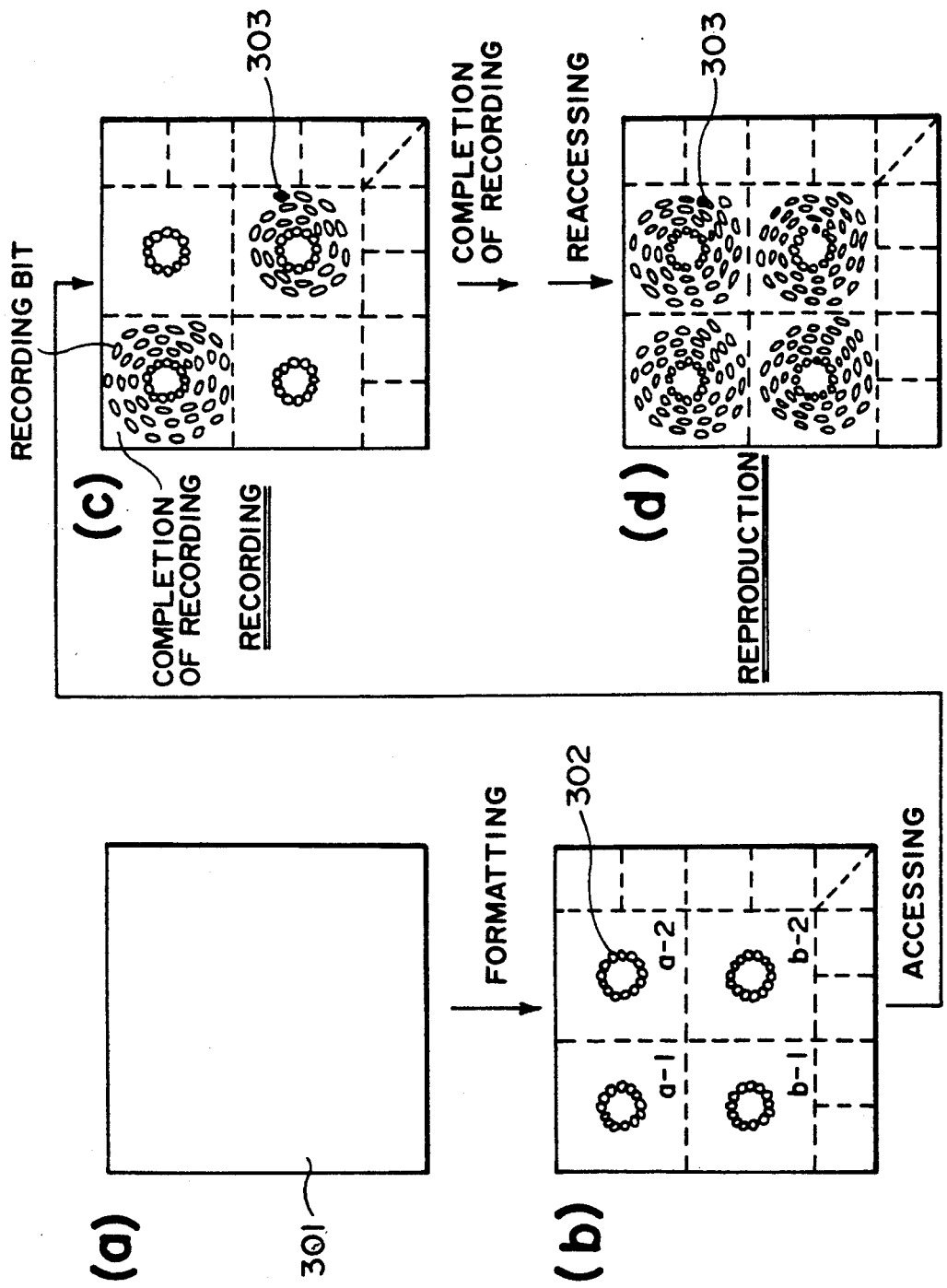
FIG. 3a-3d is an illustration showing the arrangement of the recording region in the present invention.

Next, the positional control of the probe electrode in recording/reproducing is described by referring to FIG. 2 to FIG. 4. As the circular scanning driving mechanism 109 of the probe electrode 104, for example, by use of a cylindrical piezoelectric device having a divided electrode pattern as shown in FIG. 2, and while actuating the probe electrode 104 in spiral form by applying the voltages as shown below on the respective divided electrodes 201 to 204 by the circular scanning driving circuit 110:

$$V_{+X} = V(t) \sin \omega t + V_{OS}$$

$$V_{-X} = -V(t) \sin \omega t - V_{OS}$$

$$V_{+Y} = V(t) \cos \omega t + V_{OS}'$$

$$V_{-Y} = -V(t) \cos \omega t - V_{OS}'$$

$$V(t) = At + B$$

where
ω: angular velocity
V(t): amplitude of voltage
A, B: constants,
$V_{OS}$, $V_{OS}'$: DC offset voltage for probe position fine adjustment (as described later)
a triangular pulse voltage is applied between the probe electrode 104 and the substrate electrode 101 to write the ON state at various pitches between 0.001 μm and 0.1 μm, thereby recording continuous data in spiral form on the recording region on the recording layer. Here, if the amplitude of the voltage applied on the respective divided electrodes 201 to 204 is made $$V(t) = C \cdot Int(\omega t / 2\pi) + D$$

where C,D: constants, Int(x): integer portion of x, recording of concentric circular shape can be performed. Next, while actuating the probe electrode 104 in spiral shape entirely equally as during recording, reproducing was performed by application of a voltage of 1.5 V between the probe electrode 104 and the substrate electrode 101. As the result, data signals could be read continuously with a resolution of 0.01 μm or less and at a constant speed.

Now, the method of accessing the probe electrode 104 to a plurality of recording regions is described. As shown in FIG. 3, the initial medium 301 is previously formatted. That is, at approximately the center portions of the respective recording regions a-1, a-2, . . . , b-1, b-2, . . . , recording bits of the format pattern 302 are recorded as shown in FIG. 3 (b). At this time, registration of the probe electrode 104 to the center of each recording region is effected by the coarse adjustment driving circuit 112, the coarse adjustment mechanism 113 following the set value of the microcomputer 111, and driving of the probe electrode 104 during recording of the circular format pattern 302 by the circular driving circuit 110, the circular driving mechanism 109, following the set value of the microcomputer 111. Here, the address information of each region is recorded in the format pattern. The method of accessing the probe electrode 104 to a desired region of the recording medium 102 after formatting is practiced first by registration of the probe electrode tip end 402 inside of the fomat pattern of said recording region as shown in FIG. 4 (FIG. 4A).

The registration is effected by the coarse adjustment mechanism 113, but since it is guaranteed that the probe electrode tip end will necessarily enter inside of the format pattern 403, the radius of the format pattern is required to be larger than the registration precision of the coarse adjustment mechanism. Next, as shown in FIG. 4B, circular scanning of the probe electrode tip end 402 (the radius of circular scanning is taken slightly smaller than the radius of the format pattern) is performed. At this time, if the center 401 of the recording region and the center 404 of circular scanning are coincident, the probe electrode can detect the format pattern bit 403 as shown in FIG. 4D during scanning, and the positional deviation of the center and the deviation amount (in the figure, circular scanning center is deviated in the direction of two o'clock with respect to the recording region center) can be detected from the detected position (interval $\Delta\theta$ and the position of center point $\theta_0$). Here, DC offset voltages $V_{OS}$, $V_{OS}$, as described above are added to the driving voltages $V_{+X}$ to $V_{-Y}$ to be applied on the circular scanning driving mechanism 109, the center of circular scanning is made coincident with that of the recording region (FIG. 4C). At this time, the value of the probe current becomes as shown in FIG. 4E.

As described above, after completion of access of the probe electrode 104 to the desired recording region, recording is performed by circular scanning of the probe electrode 303 around the format pattern as shown in FIG. 3 (c) (here of the recording region b-2). When recording is performed onto another recording region after completion of recording onto the desired region, after making the center of circular scanning of the probe electrode coincident with the center of the desired recording region, recording is performed similarly.

As to the accessing method during reproducing, similarly the probe electrode tip end is subjected to registration inside of the format pattern of the desired recording region, and circular scanning is performed to make the center of the recording region coincident with the center of circular scanning. Then, as shown in FIG. 3 (d), the data recorded around the format pattern (here of the recording region a-2) is reproduced by circular scanning of the probe electrode 303.

Now, when practical recording and reproducing were performed by use of the accessing method as described above, typically the recording bit size became about 10 nm, the format pattern size about 100 nm, the size of one recording region about 10 $\mu$m, the size of the whole recording region about 10 mm square, the registration precision of the circular driving mechanism about 0.1 nm, the registration precision of the coarse adjustment about 10 nm, whereby recording and reproducing of high density large capacity (about $10^{12}$ bit/cm$^2$) and high speed access (10 ms or less) were rendered possible.

As described above, as a preferred embodiment of the present invention, an example with the format pattern made circumferential, and the tip end of the probe electrode being circular scanned to be accessed to the desired recording region or reproducing region has been described, but the shape of the format pattern and scanning method of the probe electrode tip end are not particularly limited, provided that they are included within the concept of the present invention.

As described above, by performing access of a probe electrode to a recording region by recording a circumferential format pattern at the central portion of the recording region, and scanning the probe electrode in circumferential shape to detect the positional relationship between the scanning pattern and the format pattern, an information processing device of large capacity capable of high speed access having a registration precision of 1 nanometer or less can be realized with a simple constitution without performing complicated processing such as two-dimensional data processing, etc. Also, no pattern of a special shape (different from the recording bit and the arraying shape of the recording bits) is required to be provided on the format pattern as the positional standard pattern, and the same pattern as the arraying shape of the recording bits can be used as such as the positional standard pattern.

What is claimed is:

1. An accessing method for accessing a probe electrode to a data bit row recorded along a format pattern of a medium, said method comprising the steps of;
    scanning the probe electrode so that the probe electrode traces on a predetermined locus along a surface of the medium, applying a bias voltage between the probe electrode and the medium, and detecting a tunnel current which occurs between the probe electrode and the medium during said scanning, wherein a magnitude of the tunnel current is dependent on a distance between the probe electrode and the medium;
    detecting a tunnel current change which occurs when the probe electrode crosses over the format pattern;
    comparing a timing of the tunnel current change with a timing of a probe scanning signal; and
    detecting a relative position of the probe electrode to the format pattern by use of the compared timing of the tunnel current change and moving the probe electrode to the data bit row in accordance with the relative position.

2. An accessing method according to claim 1, wherein said scanning step comprises a circular scanning of the probe electrode.

3. An accessing method according to claim 1, wherein the format pattern is a circular pattern.

4. An information processing method, said method comprising the steps of:
    accessing a probe electrode to a data bit row recorded along a format pattern of a medium by scanning the probe electrode so that the probe electrode traces on a predetermined locus along a surface of the medium, applying a bias voltage between the probe electrode and the medium, and detecting as tunnel current which occurs between the probe electrode and the medium during said scanning, wherein a magnitude of the tunnel current is dependent on a distance between the probe electrode and the medium;
    detecting a tunnel current change which occurs between the probe electrode and the medium when the probe electrode crosses over the format pattern;

comparing a timing of the tunnel current change with a timing of a probe scanning signal;

detecting a relative position of the probe electrode to the format pattern by use of the compared timing of the tunnel current change and moving the probe electrode to the data bit row in accordance with the relative position; and recording information along the format pattern by scanning the probe electrode along the format pattern.

5. An information processing method according to claim 4, wherein said scanning step comprises a circular scanning of the probe electrode.

6. An information processing method according to claim 4, wherein the format pattern is a circular pattern.

7. An information processing method according to claim 4, wherein the medium has an electrical memory effect in which an electroconductivity of a portion of the medium varies depending on a voltage applied between the probe electrode and the medium.

8. An information processing method according to claim 7, wherein recording of information is preformed by applying a voltage in excess of a threshold voltage which gives rise to the electrical memory effect, between the probe electrode and the medium.

9. An information processing method according to claim 8, wherein the voltage applied is a pulse voltage.

10. An information processing method, said method comprising the steps of:

accessing a probe electrode to a data bit row recorded along a format pattern of a medium by scanning the probe electrode relative to the medium having information recorded along the format pattern so that the probe electrode traces on a predetermined locus along a surface of the medium, applying a bias voltage between the probe electrode and the medium, and detecting a tunnel current which occurs between the probe electrode and the medium during said scanning, wherein a magnitude of the tunnel current is dependent on a distance between the probe electrode and the medium;

detecting a tunnel current change which occurs when the probe electrode crosses over the format pattern;

comparing a timing of the tunnel current change which occurs when the probe electrode crosses over the format pattern;

detecting a relative position of the probe electrode to the format pattern by use of the compared timing of the tunnel current change and moving the probe electrode to the data bit row in accordance with the relative position; and reading the recorded information by scanning the probe electrode along the format pattern and reading the recorded information by detecting the tunnel current.

11. An information processing method according to claim 10, wherein said scanning step comprises a circular scanning of the probe electrode.

12. An information processing method according to claim 10, wherein the format pattern is a circular pattern.

13. An information processing method according to claim 10, wherein the medium has an electrical memory effect in which an electroconductivity of a portion of the medium varies depending on a voltage applied between the probe electrode and the medium.

14. An information processing method according to claim 13, wherein reading of information is performed by applying a voltage not in excess of a threshold voltage which gives rise to the electrical memory effect, between the probe electrode and the medium.

15. An information processing method according to claim 14, wherein the voltage applied is a bias voltage.

16. An information processing method, said method comprising the steps of:

accessing a probe electrode to a data bit row recorded along a format pattern of a medium by scanning the probe electrode relative to the medium including information recorded along the format pattern so that the probe electrode traces on a predetermined locus along a surface of the medium, applying a bias voltage between the probe electrode and the medium, and detecting a tunnel current which occurs between the probe electrode and the medium during said scanning, wherein a magnitude of the tunnel current is dependent on a distance between the probe electrode and the medium;

detecting a tunnel current change which occurs when the probe electrode crosses over the format pattern;

comparing a timing of the tunnel current change with a timing of a probe scanning signal;

detecting a relative position of the probe electrode to the format pattern by use of the compared timing of the tunnel current and moving the probe electrode to the data bit row in accordance with the relative position; and erasing recorded information by scanning the probe electrode along the format pattern and erasing the recorded information.

17. An information processing method according to claim 16, wherein said scanning step comprises a circular scanning of the probe electrode.

18. An information processing method according to claim 16, wherein the format pattern is a circular pattern.

19. An information processing method according to claim 16, wherein the medium has an electrical memory effect in which an electroconductivity of a portion of the medium varies depending on a voltage applied between the probe electrode and the medium.

20. An information processing method according to claim 19, wherein erasing of information is performed by applying a voltage in excess of a threshold voltage which gives rise to the electrical memory effect, between the probe electrode and the medium.

21. An information processing device comprising:

a recording medium having a format pattern along which data bits are recorded;

a probe electrode arranged proximately to said recording medium;

bias voltage applying means for applying a voltage between said probe electrode and said medium;

tunnel current detecting means for detecting a tunnel current flowing between said probe electrode and said medium;

a driving mechanism for scanning and moving said probe electrode relative to said medium;

tunnel current change detecting means for detecting a tunnel current change which occurs when said probe electrode crosses over said format pattern;

timing comparing means for comparing a timing of the tunnel current change with a timing of a probe scanning signal; and means for detecting a relative position of said probe electrode to said format pattern by use of a signal from said timing comparing means and for providing a signal to said driving mechanism for moving said probe electrode.

22. An information processing device according to claim 21, wherein the format pattern is a circular pattern.

23. An information processing device according to claim 21, wherein said recording medium has an electrical memory effect in which an electroconductivity of a portion of said medium varies depending on a voltage applied between said probe electrode and said medium.

24. An information processing device according to claim 21, further comprising recording/erasing signal generation means for recording and erasing information from said medium.

* * * * *

UNITED STATES PATENT AND TRADEMARK OFFICE
CERTIFICATE OF CORRECTION

PATENT NO. : 5,222,060
DATED : June 22, 1993
INVENTOR(S) : RYO KURODA ET AL.

Page 1 of 2

It is certified that error appears in the above-identified patent and that said Letters Patent is hereby corrected as shown below:

COLUMN 2

Line 38, "than" should read --different than--.

COLUMN 5

Line 32, "an" should read --a--.
Line 37, "tetrafluorotetracyanoquinodimathane" should read --tetrafluorotetracyanoquinodimethane--.
Line 52, "skelton" should read --skeleton--.

COLUMN 6

Line 24, "$V_{+y}=V(t) \cos \omega t+V_{OS}$," should read --$V_{+y}=V(t) \cos \omega t+V_{OS'}$--.
Line 26, "$V_{-y}=-V(t) \cos \omega t-V_{OS}$," should read --$V_{-y}=-V(t) \cos \omega t-V_{OS'}$--.

UNITED STATES PATENT AND TRADEMARK OFFICE
CERTIFICATE OF CORRECTION

PATENT NO. : 5,222,060
DATED : June 22, 1993
INVENTOR(S) : RYO KURODA ET AL.

Page 2 of 2

It is certified that error appears in the above-identified patent and that said Letters Patent is hereby corrected as shown below:

COLUMN 7

Line 28, "$V_{OS}$," (second occurrence) should read --$V_{OS'}$--.

Signed and Sealed this

Nineteenth Day of April, 1994

Attest:

BRUCE LEHMAN

Attesting Officer    Commissioner of Patents and Trademarks